United States Patent [19]

Aschwanden

[11] 4,145,711
[45] Mar. 20, 1979

[54] SECAM MODULATOR

[75] Inventor: Felix Aschwanden, Thalwil, Switzerland

[73] Assignee: RCA Corporation, New York, N.Y.

[21] Appl. No.: 851,780

[22] Filed: Nov. 15, 1977

[30] Foreign Application Priority Data

Nov. 15, 1976 [GB] United Kingdom ............... 47549/76

[51] Int. Cl.² ..................... H04N 9/34; H04N 9/40; H04N 9/42
[52] U.S. Cl. ..................................... 358/14
[58] Field of Search ......................... 358/14

[56] References Cited

FOREIGN PATENT DOCUMENTS 6580 4/1967 Iran.

Primary Examiner—Robert L. Richardson
Attorney, Agent, or Firm—Eugene M. Whitacre; William H. Meagher

[57] ABSTRACT

Apparatus for forming a color TV signal of a SECAM type from a pair of correlated color-difference signals (R-Y; B-Y) includes a pair of transistors disposed in a differential amplifier configuration, with a constant current source coupled to interconnected emitters, and a load impedance coupled to one collector. Pre-emphasized B-Y signal is applied to first transistor base during alternate line scanning intervals; pre-emphasized R-Y signal is applied to second transistor base during intervening line scanning intervals. Electronic switches control bias application to transistor bases so that (a) during horizontal sync intervals bases are equally biased; (b) during alternate line scanning intervals (and preceding "backporch" intervals) base bias of second transistor is elevated relative to the first; and (c) during intervening line scanning intervals (and preceding "backporch" intervals) base bias of first transistor is elevated relative to the second. During alternate line interval segments of terminal portion of vertical blanking interval, base bias of first transistor is initially held at abovementioned elevated level relative to the second and then allowed to gradually rise still higher; during the intervening line interval segments, similar control of base bias of second transistor is effected. VCO responds to changes in voltage drop across load impedance by varying its output frequency. In several illustrative applications, a synchronizing system using single reference is effective, during initial portion of horizontal sync interval, in adjusting VCO output to reference frequency. During terminal portion of horizontal sync interval, VCO output is shifted to a frequency midway between the two SECAM resting frequencies. In PAL-SECAM transcoder use, reference frequency is PAL subcarrier frequency; in video disc player use, reference frequency is subcarrier frequency of transcoded composite signal of NTSC-like form.

21 Claims, 9 Drawing Figures

Fig.6.
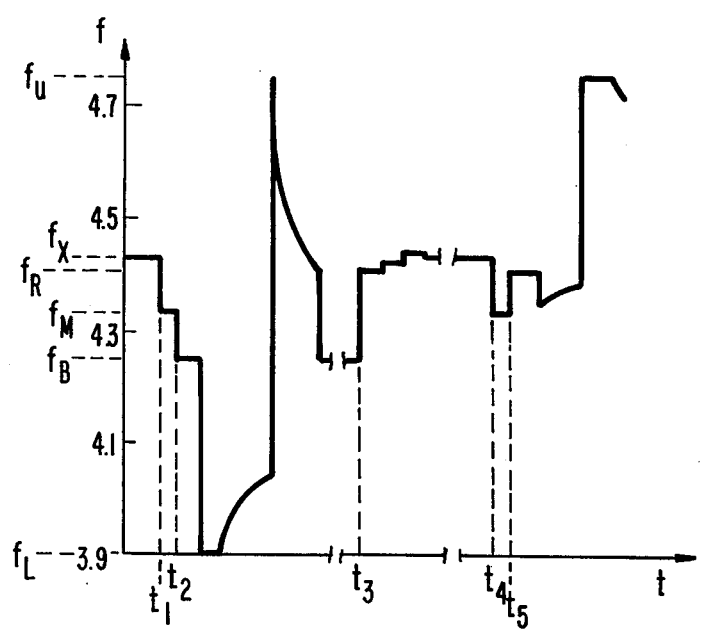
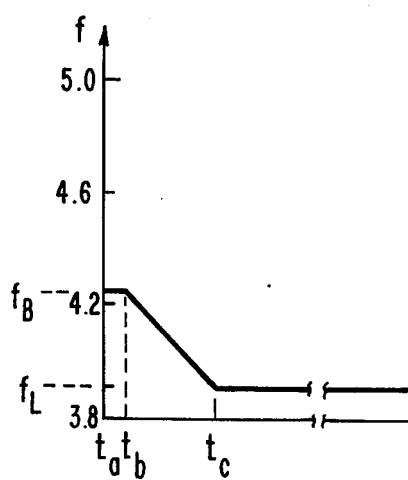
Fig.7a.
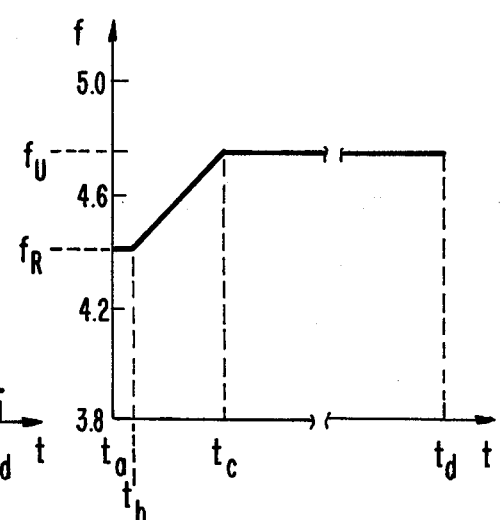
Fig.7b.

SECAM MODULATOR

The present invention relates generally to novel and advantageous apparatus for forming a color television signal of a SECAM type.

In the standard SECAM system, a subcarrier is frequency modulated in accordance with one of a pair of color-difference signals (R-Y; B-Y) during alternate line scanning intervals, and in accordance with the other of the color-difference signal pair during the intervening line scanning intervals. The subcarrier resting frequency for the B-Y line intervals differs from the subcarrier resting frequency for the R-Y line intervals, with the B-Y resting frequency (herein referred to as $f_B$) corresponding to 272 $f_H$ (or 4.250000 MHz., where the line repetition rate $f_H$ is 15,625 Hz.) and the R-Y resting frequency (herein referred to as $f_R$) corresponding to 282 $f_H$ (or 4.406250 MHz., for the aforesaid $f_H$ value). The sense of the frequency modulation is opposite for the respective color-difference signals, with positive swings of the B-Y signal causing a frequency increase, whereas positive swings of the R-Y signal cause a frequency decrease.

The respective modulating signals derived from the R-Y and B-Y color-difference signals are differently weighted such that, in the absence of pre-emphasis, the deviation range associated with R-Y modulation exceeds the deviation range associated with B-Y modulation by a ratio of 280/230. Pre-emphasis, which increases the amplitude of the higher frequency components of the respective color-difference signals relative to their DC and low frequency components, is, however, employed, and common maximum deviation range limits are set for frequency changes effected by the respective pre-emphasis signals (upper deviation limit frequency, $f_U$ = 4.756250 MHz.; lower deviation limit frequency, $f_L$ = 3.900000 MHz.). As a consequence, asymmetrical limiting of each of the pre-emphasized modulating signals is required, but with opposite senses of asymmetry. That is, during B-Y line intervals, the maximum upward frequency change from the resting frequency is limited to 506.25 KHz., while the maximum downward frequency change from the resting frequency is limited to 350 KHz.; and, during R-Y line intervals, the maximum upward frequency change from the resting frequency is limited to 350 KHz., while the maximum downward frequency change from the resting frequency is limited to 506.25 KHz.

The subcarrier is suppressed during the portion of each line blanking interval occupied by the line sync pulse. During the "backporch" of each line blanking interval (subsequent to line sync pulse termination), a subcarrier lead-in is provided, with the subcarrier appearing with the resting frequency appropriate for the color-difference signal to be presented during the subsequent line scanning interval.

During each vertical blanking interval, the subcarrier is suppressed except during the SECAM line-identification signal presentation. The line-identification signal is transmitted during nine successive line interval segments following the completion of the post-sync equalizing pulses (leaving a few subsequent line intervals free for vertical-interval test signals prior to the recommencement of picture signals). During alternate ones of these identification line interval segments, a B-Y line identification is conveyed by an initial appearance (following line sync pulse termination) of the subcarrier at the B-Y resting frequency ($f_B$ = 4.25 MHz.), followed by a linear decline of subcarrier frequency to the lower range limit ($f_L$ = 3.9 MHz.), with the remainder of the line interval segment occupied by the subcarrier held constant in frequency at $f_L$. During intervening ones of these identification line interval segments, an R-Y line identification is conveyed by initial subcarrier appearance at $f_R$, followed by linear rise of subcarrier frequency to the upper range limit $f_U$, with the remainder of the line interval segment occupied by the subcarrier held constant at $f_U$.

After formation of the modulated subcarrier signal, it is subjected to the action of an encoding filter which serves generally to increase the amplitude of the subcarrier as its deviation increases. The filter characteristic has an inverted-bell form with minimum response at a frequency (4.286 MHz.) lying between the respective resting frequencies (but closer to $f_B$ than to $f_R$). The effect of the filter is to keep the subcarrier amplitude (and consequently, its visibility) low in desaturated color picture areas, while keeping noise immunity of the chrominance signal high in saturated color picture areas.

For subcarrier visibility reduction purposes, it is important that a precise phasing of the subcarrier with respect to each line interval be set. Moreover, for subcarrier visibility reduction purposes, the SECAM system calls for a 180° phase shift of the subcarrier every third line, and at the end of each field.

Pursuant to the principles of the present invention, a pair of like transistors disposed in a differential amplifier configuration, with a constant current source coupled to the interconnected emitters, and a load impedance coupled to one collector, form a network which serves as an appropriate asymmetrical limiter for both pre-emphasized B-Y signals and pre-emphasized R-Y signals.

In accordance with an illustrative embodiment of the present invention, a pre-emphasized B-Y signal is applied to the base of a first one of the transistor pair during alternate line scanning intervals, while a pre-emphasized R-Y signal (of like polarity) is applied to the base of a second one of the transistor pair during the intervening line scanning intervals. Electronic switches control bias application to the transistor bases so that (a) during line (horizontal) sync intervals, the bases are equally biased; (b) during alternate line scanning intervals (and preceding "backporch" intervals), the base bias of the second transistor is elevated relative to the first; and (c) during intervening line scanning intervals (and preceding "backporch" intervals), base bias of the first transistor is elevated relative to the second. A voltage controlled oscillator (VCO) responds to changes in voltage drop across the load impedance by varying its output frequency.

With appropriate choice of the bias offsets provided during the respective intervals, the common network provides the different asymmetry of limiting required for each color-difference signal, while establishing the same deviation range limits for both, and inverting the sense of frequency modulation effected by one color-difference signal relative to the sense of frequency modulation effected by the other.

In accordance with a further aspect of the illustrative invention embodiment, bias control of the respective bases of the differential amplifier transistors, during a succession of line interval segments within the terminal portion of each field (vertical) blanking interval, serves to effect generation of the appropriate line identification signals. During alternate ones of such succession of line interval segments, base bias of the first transistor is initially held at the above-mentioned elevated level relative to the second, and then allowed to gradually rise still higher; the rise exceeds the level causing cut-off of the second transistor at an intermediate point in the line interval segment. During the intervening line interval segments, base bias of the second transistor is similarly controlled, with the rise exceeding the level causing cut-off of the first transistor at an intermediate point in the line interval segment.

In accordance with an additional aspect of the illustrative invention embodiment, a synchronizing system using a single reference (at a frequency $f_R$ lying within the SECAM deviation range) is effective, during an initial portion of each line sync interval, in adjusting the VCO output to the reference frequency. An output filter capacitor of the synchronizing system serves as a hold capacitor between the operating intervals of the synchronizing system, and is coupled between the load impedance of the differential amplifier and the input of a high input impedance voltage follower stage which drives the modulating signal input of the VCO. During a terminal portion of each line sync interval, the VCO output is shifted to a frequency ($f_M$) lying midway between the two SECAM resting frequencies ($f_R$, $f_B$). This shift is effected by a switch control introducing flow of an auxiliary current component in the load impedance of the differential amplifier. Upon termination of the line sync interval, the initiation of one of the previously mentioned bias offsets causes a further shift of the VCO output to the appropriate one of the SECAM resting frequencies, to produce the desired lead-in. Upon the subsequent termination of the line blanking interval, deviation about the resting frequency is effected in accordance with appropriate color-difference signal. An opposite shift from $f_M$ occurs upon termination of the next line sync interval to produce a lead-in at the other SECAM resting frequency, followed by deviation thereabout in accordance with the other color-difference signal.

Pursuant to a further aspect of the illustrative invention embodiment, phase setting of the VCO output to match the phase of the reference oscillations is effected in response to the first reference oscillation swing in a given direction following the leading edge of each line sync pulse. This phase setting ensures rapid synchronization of the VCO output with the reference oscillations. Pursuant to an additional aspect of the illustrative invention embodiment, a resetting of the VCO output phase is effected in response to the trailing edge of each line sync pulse. This resetting ensures a defined phase of each lead-in relative to its line interval.

One illustrative application of the subject invention is for SECAM signal formation in a PAL-SECAM transcoder. In such an application, the above-mentioned reference frequency is conveniently chosen to be the PAL subcarrier frequency (4.43361875 MHz.); with such choice, a single reference oscillation source may be employed to supply (a) the reference oscillations required for recovery of color-difference signals from the PAL encoded input, and (b) the reference oscillations employed in the above-described (single reference) VCO synchronizing system for the SECAM output signal forming apparatus.

Another illustrative application of the subject invention is for SECAM signal formation in a video disc player of the type described in the copending U.S. patent application of P. S. Carnt, et al., Ser. No. 822,659, filed on August 8, 1977. In the Carnt, et al player, signals recovered from a video disc record are transcoded into color television signals of an NTSC-like form, inclusive of a chrominance signal comprising a modulated color subcarrier component, with the color subcarrier frequency falling at an illustrative frequency of 283¼ $f_H$, or 4.4296875 MHz. where $f_H$ equals the aforesaid 15,625 Hz. After comb filter separation of the chrominance signal, the modulated subcarrier component is subject to synchronous demodulation to recover the color-difference signals, for application to a SECAM modulator where a SECAM type output is desired. In application of the subject invention to such a player, the above-mentioned VCO synchronizer reference frequency is conveniently chosen to correspond to the color subcarrier frequency of the transcoded signal. With such a choice, a single reference oscillation source may be employed to supply (a) the reference oscillations used for synchronous demodulation of the NTSC-form transcoded signal, and (b) the reference oscillations employed in the VCO synchronizing system of the SECAM modulator.

Other applications of the invention, as, for example, in SECAM output color television cameras, may utilize the asymmetrical limiter and line identification signal generator aspects of the invention, independent of the single reference synchronizing aspect.

In the accompanying drawings:

FIG. 1 illustrates, partially schematically and partially by block diagram representation, SECAM modulator apparatus in accordance with an embodiment of the present invention;

FIG. 2 provides a block diagram illustration of a video disc player utilizing the SECAM modulator apparatus of FIG. 1;

FIGS. 6, 7a and 7b illustrate graphically frequency swings of the SECAM modulator output, of aid in explaining the operation of the apparatus of FIG. 1.

Figure 1:
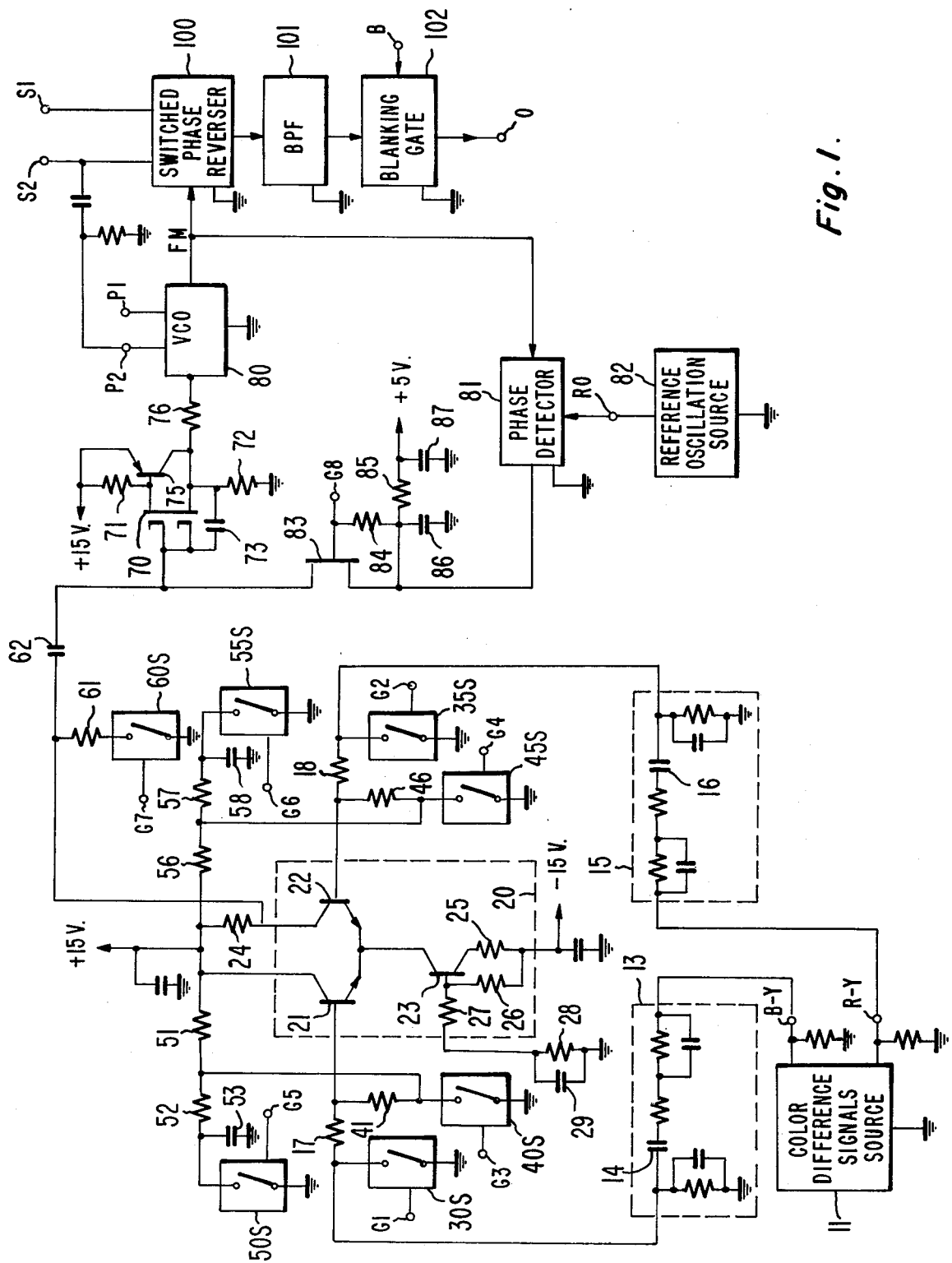
Figure 3:
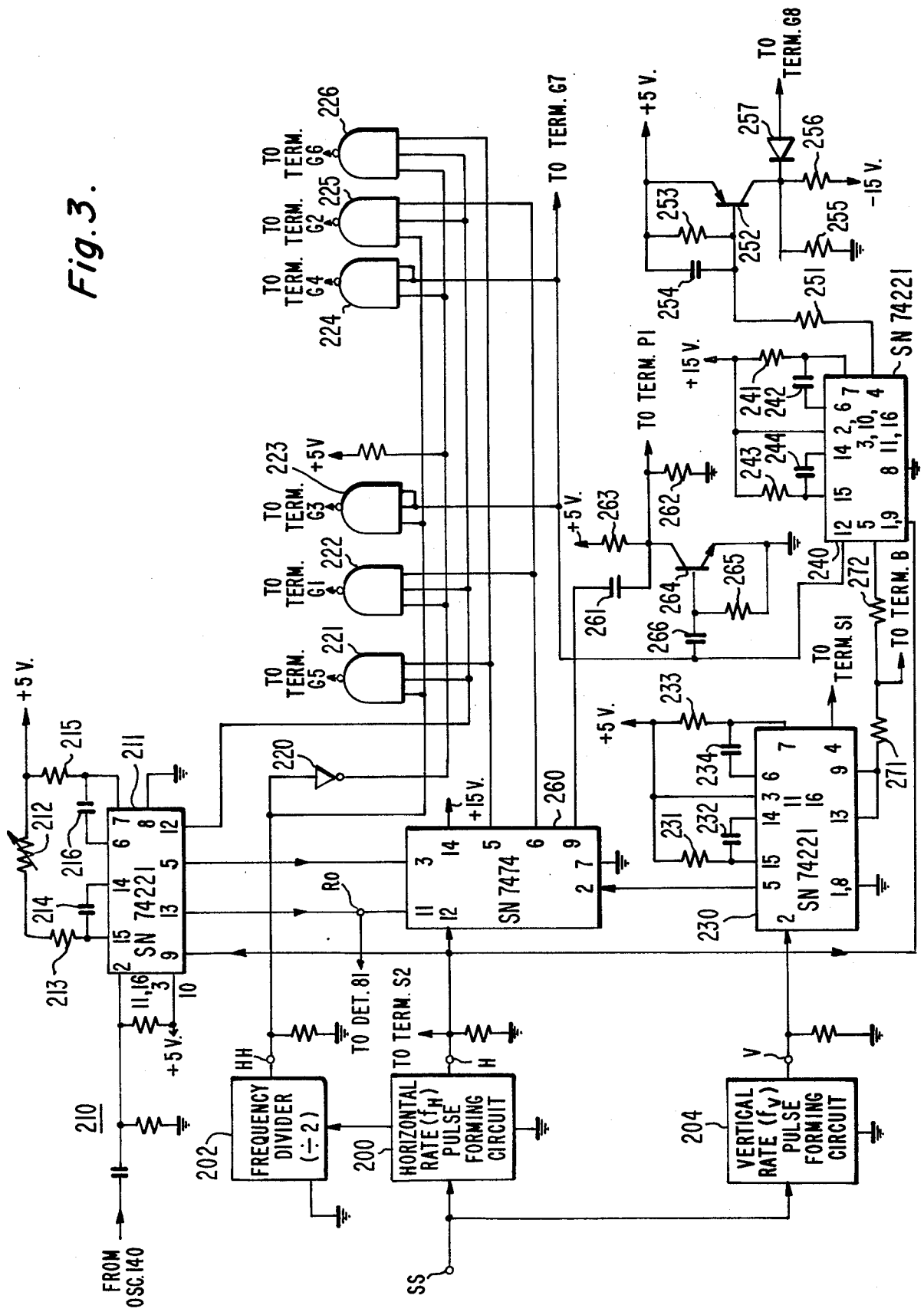
FIG. 3 illustrates, partially schematically and partially by block diagram representation, control pulse forming circuits that may be employed in the player of FIG. 2, to control the SECAM modulator apparatus of FIG. 1.
Figure 8:
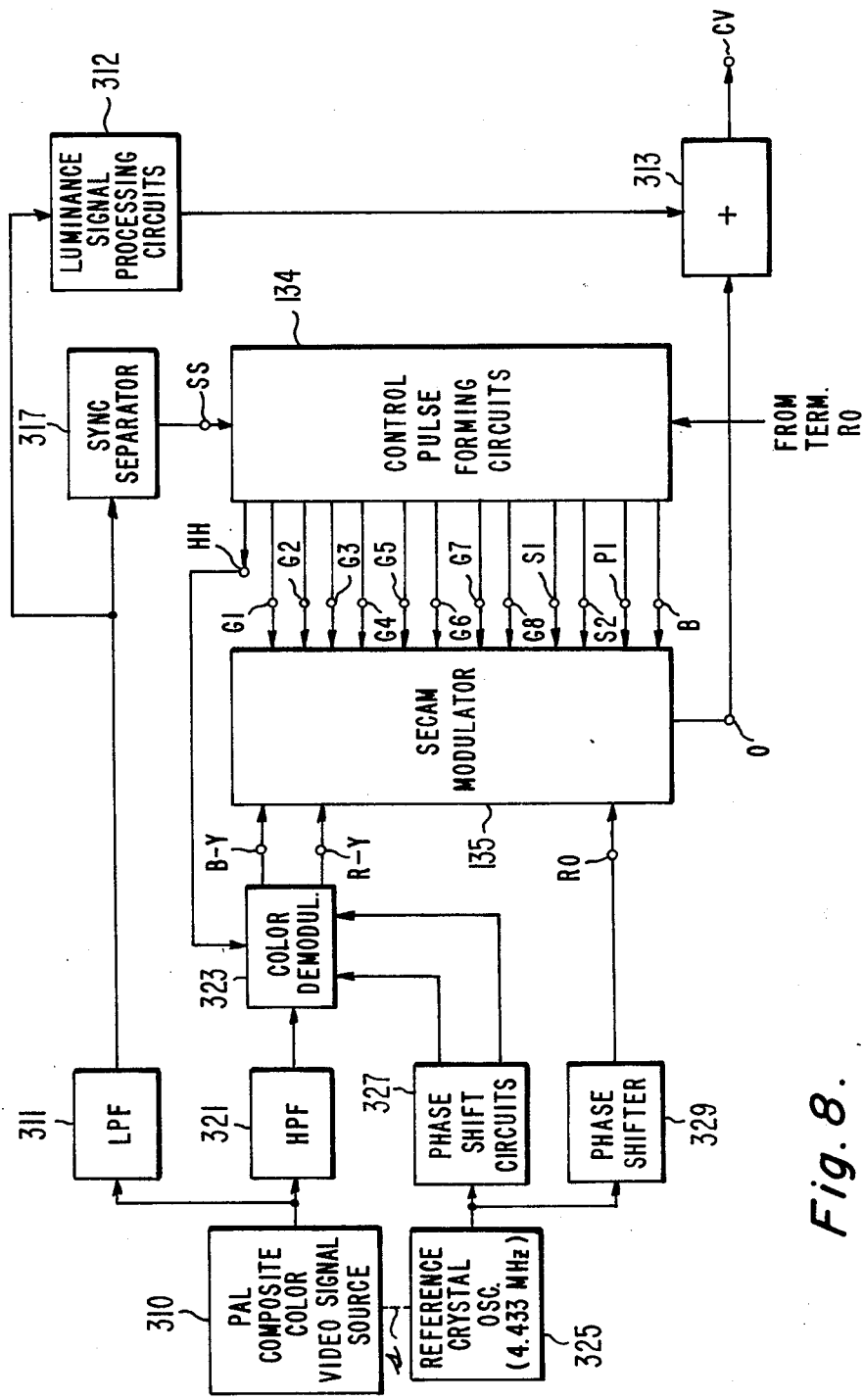

FIG. 8 provides a block diagram illustration of a PAL-SECAM transcoder utilizing the SECAM modulator apparatus of FIG. 1 and the control pulse forming circuits of FIG. 3.

In FIG. 1, a source 11 delivers correlated blue and red color-difference signals to respective input terminals, B-Y and R-Y, of a SECAM modulator embodying the present invention. The blue color-difference signal at terminal B-Y is applied to the input of a B-Y signal pre-emphasis and attenuator network 13, which provides the relative signal-weighting and pre-emphasis of high frequency components required for the blue color-difference signal in a SECAM transmission system. The output of network 13 is coupled via resistor 17 to the base of an NPN transistor 21. The red color-difference signal at terminal R-Y is applied to the input of an R-Y signal pre-emphasis and attenuator network 15, which provides the relative signal weighting and pre-emphasis of high frequency components required for the red color-difference signal in a SECAM transmission system. The output of network 15 is coupled via resistor 18 to the base of another NPN transistor 22.

Transistors 21 and 22 are disposed in a differential amplifier configuration, with their emitters jointly connected via the collector-emitter path of a third NPN transistor 25 and an emitter resistor 25 to a negative potential supply point (−15V). A trio of resistors 26, 27, 28 are connected in series between the negative potential supply point and a point of ground potential, with the junction of resistors 26 and 27 connected to the base of transistor 25, and with a capacitor 29 shunted across resistor 28. The collector of transistor 21 is directly connected to a positive potential supply point (+15V.), while the collector of transistor 22 is connected to the +15V point via a resistor 24, which serves as the load impedance of the amplifier. Illustratively, transistors 21, 22 and 23 and resistors 25, 26 and 27 are incorporated in an integrated circuit 20 of the CA 3053 type. With suitable choice of external resistor 28, in the light of the supply potentials utilized, transistor 23 serves as a source of a substantially constant current of a desired magnitude, with division of said current between transistors 21 and 22 determined by the relative potentials of their respective bases. By suitable choice of the value of external resistor 24, a given magnitude of change in voltage drop across the load impedance will accompany the swing in amplifier operation from cut-off of transistor 21 to cut-off of transistor 22.

An electronic switch 30S, when closed, directly connects the output of network 13 to a point of ground potential, precluding signal application from the B-Y pre-emphasis network to the base of transistor 21. When switch 30S is open, such signal application is enabled. Control of the opening and closing of switch 30S is effected by a control signal applied to the switch control signal input terminal G1 of switch 30S.

An electronic switch 35S, when closed, connects the output of the network 15 to a point of ground potential, precluding the application of pre-emphasized R-Y signals to the base of transistor 22. Such signal application is enabled, however, when switch 35S opens. Control of the opening and closing of switch 35S is determined by a control signal applied to the switch control signal input terminal G2 of switch 35S.

A resistor 41 is connected between the base of transistor 21 and a terminal of an electronic switch 40S, which switch terminal is also connected to the junction of a pair of resistors 51, 52 serially connected between the positive potential supply point (+15V) and a terminal of an electronic switch 50S. When switch 40S is closed, the end of resistor 41 remote from the transistor base is directly returned to a point of ground potential. When switch 40S is open, the end of resistor 41 remote from the transistor base is free to depart from ground potential to a potential determined by the switching condition of switch 50S. Switch 50S serves to ground the end of resistor 52, remote from resistor 51, and to short circuit a capacitor 53 coupled between said remote end of resistor 52 and ground, when it is closed. If switch 50S is closed when switch 40S opens, resistors 51 and 52 form a voltage divider across a +15V supply, and resistor 41 is returned to a point of positive potential of a magnitude determined by the voltage divider action. However, if switch 50S thereafter opens (while switch 40S remains open) and removes the ground connection for the voltage divider and the short-circuit across capacitor 53, the potential at the junction of resistors 51 and 52 to which resistor 41 is returned commences a rise beyond said magnitude, as capacitor 53 charges toward the +15 volt supply potential.

A similar bias control system is associated with the base of transistor 22, with a resistor 46 connected between said base and a terminal of electronic switch 45S, which switch returns the resistor 46 to a point of ground potential when it is closed. The end of resistor 46 remote from the transistor base is connected to the junction of voltage divider resistors 56, 57. The end of resistor 56 remote from the junction is connected to the +15V potential supply point, while the end of resistor 57 remote from the junction is connected to a terminal of electronic switch 55S. Switch 55S grounds said remote end of resistor 57, and short circuits a capacitor 58 (coupled between said remote end of resistor 57 and ground), when it is closed.

Control of the opening and closing of the respective switches 40S, 45S, 50S and 55S is effected by respective control signals applied to the respective switch control signal input terminals G3, G4, G5 and G6.

A resistor 61 (of a considerably larger value than resistor 24) is connected between the collector of transistor 22 and a terminal of an electronic switch 60S. When switch 60S is closed, the end of resistor 61 remote from the transistor collector is directly returned to a point of ground potential, causing a current component to be drawn through resistor 24 which is auxiliary to whatever current is drawn therethrough by transistor 22. When switch 60S is open, resistor 61 is open-circuited, and the drawing of said auxiliary current component is precluded.

A capacitor 62 is coupled between the collector of transistor 22 and the input of a high input impedance voltage follower stage, illustratively formed by an insulated-gate field effect transistor 70 (of a dual-gate, N-channel type) driving a PNP transistor 75. The drain electrode of IGFET 70 is connected via resistor 71 to the +15V. supply point, while the source electrode is returned to ground via a resistor 72. The base electrode of transistor 75 is directly connected to the IGFET drain electrode, while the emitter electrode of transistor 75 is directly connected to the +15V. supply point, and the collector electrode of transistor 75 is directly connected to the IGFET source electrode. A capacitor 73 is coupled between the source electrode and the voltage follower input (the interconnected gate electrodes of IGFET 70).

The output of the voltage follower stage is applied via a resistor 76 to the modulating signal input terminal of a voltage controlled oscillator (VCO) 80, illustratively comprising a multivibrator developing a pulse train output (at oscillator output terminal FM) with an output frequency varying in accordance with the voltage supplied to the modulating signal input terminal. A phase detector 81, responsive to respective inputs supplied from VCO output terminal FM, and from an output terminal (RO) of a reference oscillation source 82, develops an output voltage indicative of departures, if any, from a predetermined phase relationship between the respective inputs.

The output of phase detector 81 is coupled to the source electrode of a field effect transistor 83 (of the junction type). The source electrode of FET 83 is connected via a resistor 84 to the gate electrode of FET 83, and via a resistor 85 to a point of positive supply potential (+5V.). Filter capacitors 86 and 87 are connected between each end of resistor 85 and ground. The drain electrode of FET 83 is directly connected to the interconnected gate electrodes of IGFET 70. A control signal input terminal G8 is connected to the gate electrode of FET 83.

When a forward bias potential is supplied to the base of FET 83 via terminal G8, FET 83 provides a conductive, low impedance path between the output of phase detector 81 and the input of the voltage follower stage 70-75. Under such conditions, a phase-locked loop is established which effects frequency and phase synchronization of the output of VCO 80 with the output of the reference oscillation source 82. In the absence of forward bias application via terminal G8, FET 83 is nonconductive, and the phase-locked loop is disrupted, isolating the gates of IGFET 70 from the output of phase detector 81. When conduction by FET 83 terminates, however, capacitor 62 acts as a hold capacitor, storing the phase detector output existing at the termination of the conducting period for FET 83.

The VCO output at terminal FM is also applied to a switched phase reverser 100, which additionally receives field rate signals and line rate signals at respective input terminals S1 and S2. Phase reverser 100 serves to reverse the phase of the VCO output every third line interval, and every other field interval. The output of phase reverser 100 is applied to a band pass filter 101, having a pass band encompassing the desired SECAM frequency deviation range ($f_L$ to $f_U$) and appropriate sidebands thereof. Desirably, the filter also incorporates circuitry providing a frequency response characteristic over the deviation range of the inverted-bell form appropriate for the previously described SECAM encoding filter function. The output of filter 101 is supplied to a blanking gate 102, also responsive to a suitable blanking waveform supplied to a blanking signal input terminal. Blanking gate 102 functions to normally pass the signal output of filter 101 to output terminal 0, but to bar such passage during line sync intervals, and during field blanking intervals (except during those portions occupied by the aforementioned SECAM line identification signals).

The phase of the output of VCO 80 is subject to the phase setting action of phase setting pulses applied to VCO 80 via respective phase setting pulse input terminals P2 and P1. The phase setting pulses supplied to terminal P2 are derived by differentiation of the line rate pulses delivered to terminal S2.

Figure 2:
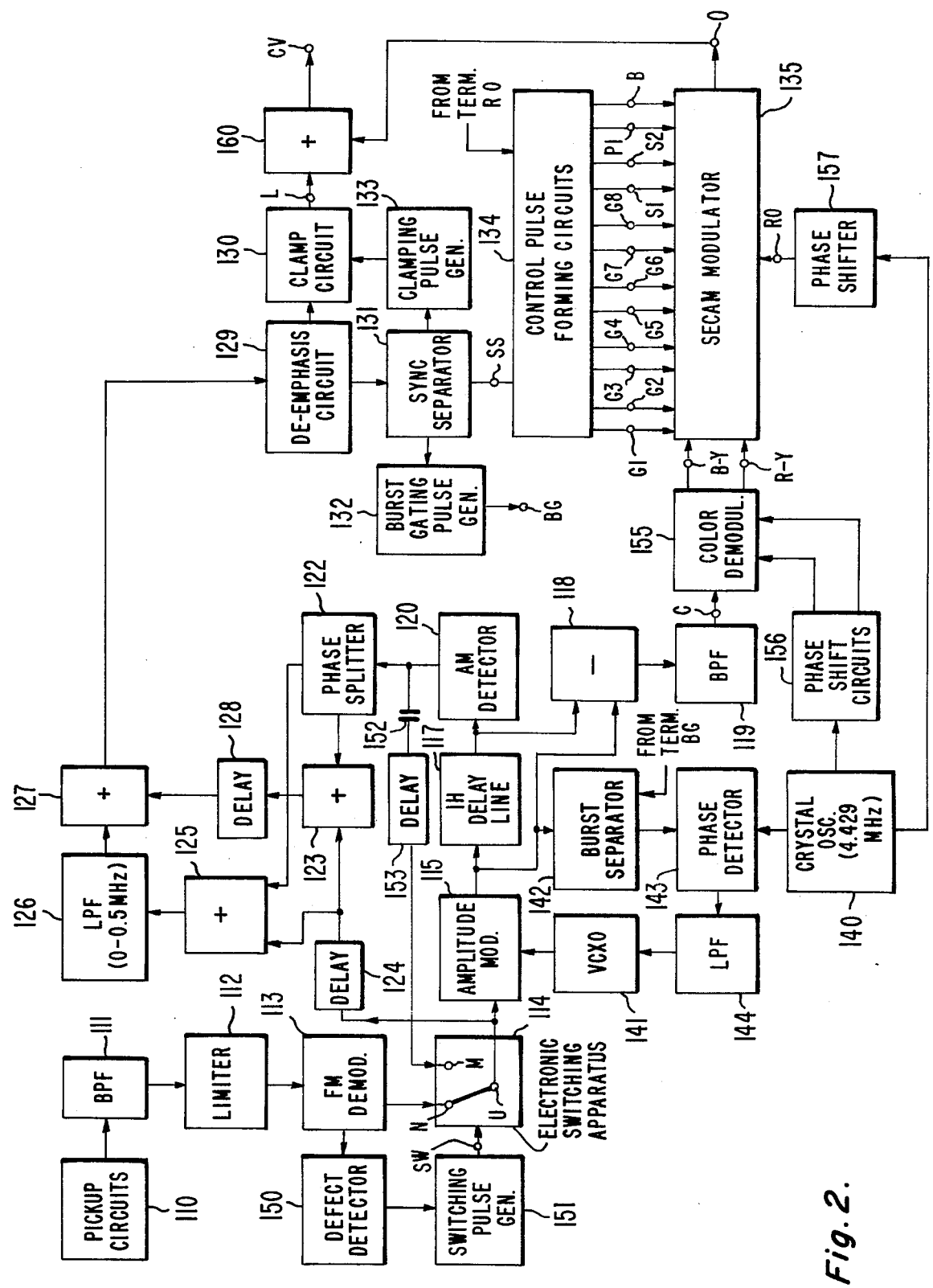

For a first illustration of apparatus in which the SECAM signal forming system of FIG. 1 may be used advantageously, reference is made to the video disc player shown in FIG. 2. The video disc player of FIG. 2 is of a general type described in the aforementioned Carnt, et al. application, suitable for playback of video disc records bearing color television signal information encoded in a modified "buried subcarrier" format also described in said Carnt, et al. application. Illustratively, such format employs a color subcarrier frequency of 1.4765875 MHz. (equal to the sum of one-half a field frequency of 50 Hz. and 189 times one-half of a line frequency of 15,625 Hz.). Quadrature-related phases of the color subcarrier are modulated by respective R-Y and B-Y color-difference signals (of 0–500 KHz. bandwidth) and summed to form a chrominance component, to accompanying a luminance component restricted to a bandwidth of 0–3 MHz. As in U.S. Pat. No. 3,872,498, prior to addition with the buried subcarrier sideband components, the luminance signal component is subject to comb filtering, at least in a to-be-shared midband region (e.g., 1–2 MHz.), to prepare signal-free spectrum troughs for buried subcarrier sideband component occupancy. While the luminance component combing may extend beyond the midband boundaries, it is desirable that a low frequency portion (e.g., 0–900 KHz.) remain effectively uncombed, so as to permit retention in the recorded luminance signal of "vertical detail" information. The modulated color subcarrier waves are also subject to comb filtering prior to addition with the luminance signal so as to substantially confine the buried subcarrier sideband components to the aforementioned trough regions. The recorded signal comprises carrier frequency oscillations modulated in frequency (e.g., over a deviation range of 4.3 MHz to 6.3 MHz.) in accordance with the amplitude of a composite signal formed by summing the above-described luminance and chrominance components.

In the FIG. 2 player, pickup circuits 110 deliver a recovered version of the recorded signal to a bandpass filter 111, having a pass band encompassing the deviation range of the recorded FM signal and appropriate sidebands thereof. The bandpass filter output is applied via a limiter 112 (removing spurious amplitude modulation) to the input of an FM demodulator 113. The output of FM demodulator 113, comprising a composite color television signal of the aforementioned modified buried subcarrier type, is supplied to an input terminal N of electronic switching apparatus 114, which, during normal signal recovery periods, conveys such signals to output terminal U of the switching apparatus.

The signals appearing at terminal U are applied to the modulating signal input of an amplitude modulator 115, which receives carrier frequency oscillations from a voltage controlled crystal oscillator (VCXO) 141. Modulator 115 serves to effect an up-conversion of the buried subcarrier chrominance component. With the nominal operating frequency of VCXO 141 corresponding to the sum of the buried subcarrier frequency (189 $f_H$/2 + $f_V$/2) and a frequency equal to 567 $f_H$/2 (or 4.4296875 MHz.), the output of modulator includes a lower sideband in which the subcarrier frequency nominally falls at 4.4296875 MHz. (which will hereinafter be referred to as 4.429 MHz, for the sake of convenience).

To assure that the desired up-conversion is effected in the face of possible time base errors suffered in the recorded signal pickup process, control of VCXO 141 is effected by the filtered output of a phase detector 143 as delivered by low pass filter 144. The phase detector 143 is responsive to color synchronizing bursts of the up-converted signal separated from the modulator output by a burst separator 142, and to the output of a reference crystal oscillator 140. The reference frequency of the output of oscillator 140 is the aforementioned 4.429 MHz., the desired up-converted subcarrier frequency. The burst separator action is controlled by appropriately timed gating pulses supplied from terminal BG, and burst separator 142 incorporates frequency selective circuits appropriate to response to the lower sideband subcarrier component (to the exclusion of an upper sideband subcarrier component). The control of VCXO 141 opposes departures from frequency and phase synchronism between the outputs of separator 142 and oscillator 140, whereby stability of location of the up-converted color subcarrier at the desired odd integral multiple of half the line frequency is maintained.

The output of modulator 115 is applied to a 1H delay line 117 (providing a delay corresponding to a period at $f_H$, i.e., 64 microseconds). The input and output of delay line 117 are subtractively combined in signal combiner 118 to obtain the effect of a comb filter having multiple passbands centered about odd integral multiples of half the line frequency, (permitting passage of the upconverted color subcarrier and its sideband components), and intervening rejection notches centered about even integral multiples of half the line frequency (rejecting interleaved luminance components). Bandpass filter 119, coupled to the output of combiner 118, provides an output signal (at terminal C) confined to the bandwidth of the up-converted chrominance signal, and comprising said up-converted chrominance signal to the substantial exclusion of accompanying luminance signal components.

The output of delay line 117 is also applied to an amplitude modulation detector 120 to develop a delayed version of the baseband input signal appearing at terminal U. A phase splitter 122, coupled to the output of detector 120, develops a first delayed baseband signal output for additive combination with the input signal from terminal U in combiner 123, and a second delayed baseband signal output (phase inverted relative to the first output) for additive combination with the input signal from terminal U in combiner 125. The phasing of the first output is such that combiner 123 provides a comb filter of the type having rejection notches at odd integral multiples of half the line frequency, whereby the output of combiner 123 comprises luminance signal components freed from accompaniment by buried color subcarrier components. A complementary comb filter characteristic is provided by combiner 125; lowpass filter 126, coupled to the output of combiner 125, and having an illustrative passband of 0–0.5 MHz., derives a vertical detail signal for ultimate recombination with luminance signal components present in the output of combiner 123.

A delay device 124 is interposed in the input signal path extending from terminal U to combiners 123 and 125. The function of the delay device 124 is to compensate for extra delay introduced in the path of the delay line output to the aforesaid combiners (e.g., extra delay contributed by output filters of detector 120) so as to ensure that the delay difference for the two inputs is of the desired 64 microsecond value.

An adder 127 combines vertical detail information supplied by filter 126 with luminance signal components passed by combiner 123. A delay device 128, interposed in the signal path from combiner 123 to adder 127, provides a delay substantially matching the delay associated with low pass filter 126, so that the respective components of the luminance signal are recombined in adder 127 with proper relative timing.

The output of adder 127 is applied to a de-emphasis circuit 129, having a frequency response characteristic complementary to that employed in pre-emphasis of high frequency components of the luminance signal (in formation of a recording signal). The output of de-emphasis circuit 129 is supplied to a keyed clamp circuit 130, which develops at terminal L a luminance signal with its DC component properly restored. The output of de-emphasis circuit 129 is also applied to a sync separator 131, which separates out the deflection synchronizing components of the recorded signal. A burst gating pulse generator 132, responding to an output of sync separator 131, develops burst gating pulses of suitable "backporch" timing for delivery to terminal BG. A clamping pulse generator 133, also responding to an output of sync separator 131, develops keying pulses, for application to clamp circuit 130, which are timed to coincide, for example, with an intermediate portion of each line sync internal. Separated line and field synchronizing components appear at an output terminal SS of sync separator 131. Circuitry for performing the functions of separator 131 and generators 132 and 133 may illustratively be as shown in U.S. Pat. No. 4,057,826 — Baker.

As explained previously, during normal signal pickup operations, the output of FM demodulator 113 is normally conveyed from terminal N to terminal U of switching apparatus 114. However, during signal defect conditions, as detected by a defect detector 150 coupled to FM demodulator 113, the normal signal path between terminals N and U is disrupted in response to the action of a switching pulse generator 151, controlled by detector 150. Under these conditions, a substitute signal is conveyed to terminal U from terminal M of switching apparatus 114. The subsitute signal comprises a delayed baseband signal derived from the output of detector 120 and applied to terminal M via a signal path incorporating a coupling capacitor 152 and a delay device 153 (providing a delay corresponding to a half period at the buried subcarrier frequency). Reference may be made to U.S. Pat. No. 3,969,759 — Amery for a more detailed explanation of this signal substitution technique, to U.S. Pat. No. 4,038,686 — Baker for a description of illustrative circuitry for performing the function of defect detector 150, and to U.S. Pat. No. 3,909,518 — Baker for a description of illustrative circuitry for performing the functions of generator 151 and switching apparatus 114.

The luminance signal appearing at terminal L is applied to an adder 160, for combination with a chrominance signal of SECAM form, to develop a composite color video output signal at terminal CV. The chrominance signal input to adder 160 is supplied from the output terminal 0 of a SECAM modulator 135 of the form described in FIG. 1.

To develop the correlated red and blue color-difference signals required for application to the color-difference signal input terminals R-Y and B-Y of modulator 135, synchronous color demodulators 155 are provided, responding to the up-converted chrominance signal appearing at terminal C, and to appropriately phased reference oscillations of the up-converted subcarrier frequency derived by phase shift circuits 156 from an output of reference crystal oscillator 140. An output of oscillator 140 is also applied to a phase shifter 157 to develop the reference oscillation input for application to the reference oscillation input terminal RO of modulator 135. The various control pulses required for application to the input terminals B, P1, S1, S2, and G1 through G8 of modulator 135 are supplied by control pulse forming circuits 134 (to be subsequently described), which are responsive to inputs from terminals SS and RO.

It will be seen from the foregoing that in the described video disc player use of the FIG. 1 modulator, the reference frequency ($f_X$) employed for oscillator synchronization is equal to 567 $f_H/2$ and is derived from the same reference oscillation source (oscillator 140) as is employed for (a) time base error correction of the up-converted chrominance signal, and (b) synchronous demodulation of said up-converted chrominance signal.

Figure 5:
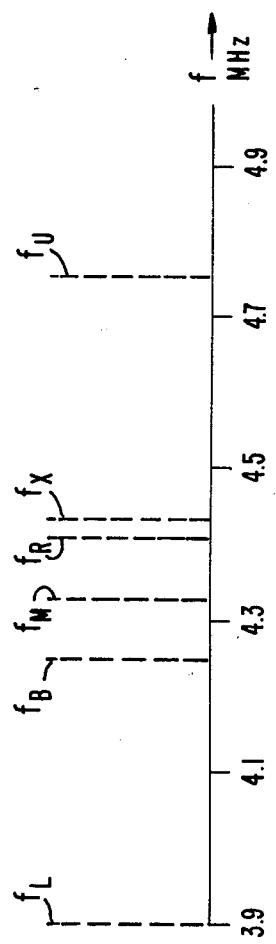
FIG. 5 illustrates graphically frequency locations of aid in explaining the operation of the SECAM modulator apparatus of FIG. 1.

As illustrated graphically in FIG. 5, the reference frequency $f_X$, of the aforementioned 567 $f_H/2$ value, lies within the SECAM deviation range defined by the respective lower and upper limit frequencies, $f_L$ and $f_U$. As further illustrated in FIG. 5, $f_X$ lies slightly above the resting frequency $f_R$ for the R-Y line intervals. The resting frequency $f_B$ for the B-Y line intervals lies below $f_R$. A frequency (equal to 277 $f_H$), lying midway between $f_B$ (272 $f_H$) and $f_R$ (282 $f_H$), is identified as $f_M$ in FIG. 5.

To aid in an explanation of the operation of the FIG. 1 modulator in the illustrative player system of FIG. 2, reference may be made to FIG. 6 which provides a plot of the output frequency of VCO 80 versus time during portions of two successive line scanning intervals and the respectively preceding line blanking intervals. At the beginning of the plot, corresponding to an intermediate point in a line synchronizing interval (preceding a B-Y line interval), the VCO output frequency is stabilized at the reference frequency $f_X$. This represents the successful culmination of the action of the previously mentioned phase-locked-loop utilizing phase detector 81 in synchronizing VCO 80 with the reference oscillations (from oscillator 140, FIG. 2). During this oscillator synchronizing period, FET 83 is conductive (permitting loop closing), while switch 60S is open (open-circuiting resistor 61), and switches 30S, 35S, 40S, 45S, 50S and 55S are all closed (barring signal application from terminals R-Y, B-Y to the transistors 21, 22, and holding the bases of transistors 21 and 22 equally biased at ground potential, whereby substantially half the current supplied via transistor 23 passes through the load impedance 24).

At time $t_1$, corresponding to the time of appearance of the trailing edge of a horizontal sync pulse at the end of the line synchronizing interval, conduction by FET 83 ceases, opening the phase-locked loop. The charge on capacitor 62, established during the synchronizing period, is retained. At the same time ($t_1$), switch 60S closes, completing a path via resistor 61 which causes the drawing of an auxiliary current component through the load impedance 24 (to alter the voltage to which the "cold" side of capacitor 62 is returned). The resistance value of resistor 61 is chosen so as to cause a predetermined increase in the voltage drop across the load impedance. Because of the high input impedance of the voltage follower stage 70-75, the control voltage applied to the modulating signal input of VCO 80 closely follows the downward shift of the voltage at the collector of transistor 22, with the predetermined magnitude of voltage change causing the VCO output frequency to shift to $f_M$ (midway between $f_R$ and $f_B$), as shown in FIG. 6. A phase setting pulse, responsive to the horizontal sync pulse trailing edge, is applied (via terminal P2) to reset the multivibrator incorporated to VCO 80, to assure a defined phase of the VCO output relative to the horizontal sync pulse.

Shortly thereafter (at time $t_2$), but prior to the end of the "backporch" portion of the line blanking interval, switch 45S opens (while switches 35S, 55S, 30S, 40S, and 50S remain closed). The bias potential applied to the base of transistor 22 rises to a predetermined level above ground potential (as determined by voltage dividers formed by resistors 56, 57 and 46, 18), while the bias potential applied to the base of transistor is held at ground potential. A predetermined increase in the current drawn by transistor 22 occurs, and a further downward shift of the voltage at the collector of transistor 22 results, moving the VCO output frequency of $f_B$, the resting frequency for a B-Y line. The VCO output frequency remains at this value for the balance of the line blanking interval to provide the desired B-Y carrier lead-in (as shown in FIG. 6).

When the line blanking interval terminates, and an active line scanning interval begins, switch 30S also opens, permitting the potential at the base of transistor to depart from ground potential in accordance with swings of the B-Y color-difference signal supplied by network 13. The periodically closed switch 30S cooperates with the series capacitor 14 of network 13 to form a keyed clamp circuit, which ensures that the applied B-Y color-difference signal appears at the base of transistor 21 with its DC component restored. Negative swings of the B-Y color-difference signal output of network 13 cause a depression of the voltage at the collector of transistor 22, lowering the VCO output frequency below the $f_B$ value, whereas positive swings thereof elevate the VCO output frequency above the $f_B$ value. For the illustrative swings represented in FIG. 6, a pre-emphasized edge of a negative swing of the B-Y signal (which effects cut-off of transistor 21) brings the VCO output frequency to the lower limit frequency ($f_L$), while a pre-emphasized edge of a positive swing of the B-Y signal (which effects cut-off of transistor 22) brings the VCO output frequency to the upper limit frequency ($f_U$).

At the beginning of the next succeeding line synchronizing interval ($t_3$), switches 30S and 45S return to their closed conditions, switch 60S opens, and FET is again rendered conductive. A new oscillator synchronizing period now beings. At the onset of this synchronizing period, a phase-setting pulse, applied via terminal P1, resets the phase of the VCO output to obtain the desired phase relationship between the respective inputs to phase detector 81, aiding rapid synchronization of VCO 80. Frequency discrepancies between the respective inputs result in alterations of the charge of capacitor 62 and resultant compensating shifts in the frequency of the VCO output, until the output stablizes at the reference frequency $f_X$ (as shown in FIG. 6).

At time $t_4$, corresponding to horizontal sync pulse trailing edge appearance, FET 83 again opens, and switch 60S closes, shifting the VCO output frequency again to $f_M$ (see FIG. 6). Phase resetting, per phase setting pulse application via terminal P2, again occurs. Shortly after the sync pulse trailing edge appearance, i.e., at time $t_5$, switch 40S opens, allowing the bias potential at the base of transistor 21 to rise above ground potential to a level determined by voltage dividers formed by resistors 51, 52 and 41, 17, while the bias at the base of transistor 22, is held at ground potential (switches 35S, 45S, and 55S remaining closed). The elevation of the potential at the collector of transistor 22 shifts the VCO output frequency upward to $f_R$ (for production of the R-Y carrier lead-in).

Thereafter, at the beginning of the succeeding active line scanning interval, switch 35S opens, permitting the potential at the base of transistor 22 to depart from ground potential in accordance with swings of the R-Y color-difference signal supplied by network 15. The periodically closed switch 35S cooperates with the series capacitor 16 of the network 15 to form a keyed clamp circuit, which ensures that the applied R-Y color-difference signal appears at the base of transistor 22 with its DC component restored. Negative swings of the R-Y color-difference signal output of network 15 cause the voltage at the collector of transistor 22 to elevate, raising the VCO output frequency above $f_R$; positive swings thereof depress the VCO output frequency below $f_R$: For an illustrative swing represented in FIG. 6, a pre-emphasized edge of a negative swing of the R-Y signal (which effects cut-off of transistor 22) brings the VCO output frequency to the upper limit frequency ($f_U$).

For aid in understanding of the operation of the modulator of FIG. 1 in production of SECAM line identification signals, reference may first be made to FIG. 7a, which provides a plot of VCO output frequency versus time during a B-Y line identification interval (occurring during alternates ones of a succession of line interval segments, occurring during the vertical blanking interval, after the post-sync equalizing pulses). After oscillator synchronization has been effected during the preceding line sync pulse (in the manner previously described), time $t_a$ occurs at sync pulse termination. At time $t_a$, FET 83 opens, switch 60S closes and switch 45S opens (with switches 30S, 40S, 50S, 35S and 55S remaining closed) so that the VCO output frequency lies at the $f_B$ value. Subsequently, at time $t_b$, switch 55S also opens, removing the short-circuit across capacitor 58. Capacitor 58 commences to charge toward the supply potential, and the bias potential at the base of transistor 22 rises (above the level associated with $f_B$ production). A gradual depression of the VCO output frequency ensues, as shown in FIG. 6. When the bias potential rises beyond the level necessary to cut off transistor 21, the potential at the collector of transistor 22 ceases its depression and remains fixed at a level resulting in a VCO output frequency of $f_L$, at which frequency it remains until the line interval termination.

FIG. 7b provides a plot of VCO output frequency versus time during an R-Y line identification interval (occurring during intervening ones of the aforesaid succession of line interval segments). Upon sync pulse termination (time $t_a$, FIG. 7b), the synchronized VCO shifts its output frequency to $f_R$ (due to the following conditions: FET 83 open, switch 60S closed, switch 40S open, and switches 30S, 50S, 35S, 45S, and 55S closed). Subsequently (at time $t_b$, FIG. 7b), switch 50S also opens, removing the short-circuit across capacitor 53. Capacitor 53 commences to charge toward the supply potential, and the bias potential at the base of transistor 21 rises (above the level associated with $f_R$ production). A gradual rise of the VCO output frequency ensues, as shown in FIG. 6. When the bias potential rises beyond the level necessary to cut off transistor 22, the potential at the collector of transistor 22 ceases its rise and remains fixed at a level resulting in a VCO output frequency of $f_U$, at which frequency it remains until the line interval termination.

FIG. 3 discloses an illustrative logic circuit arrangement which may be employed in implementing the functions of the control pulse forming circuits of FIG. 2, in response to inputs from the sync separator 131 and reference oscillator 140 of the player apparatus of FIG. 2. The logic circuit arrangement shown in FIG. 3 employs a trio of integrated circuits (211, 230, and 240) of the SN 74221 type, and an integrated circuit (260) of the SN 7474 type. The logic circuitry also includes six nand gates (221, 222, 223, 224, 225 and 226), which illustratively comprise respective sections of a pair of integrated circuits of the SN 7410 type.

The separated synchronizing components appearing at terminal SS (see FIG. 2) are applied to a horizontal rate pulse forming circuit 200, and to a vertical rate pulse forming circuit 204. Pulse forming circuit 200 develops at its output terminal H pulses at the $f_H$ rate representative of the line sync pulse component of the recorded signal. An output of circuit 200 is also supplied to frequency divider 202, which develops pulses of half line frequency ($f_H/2$) at its output terminal HH. Pulse forming circuit 204 develops at its output terminal V pulses at the $f_V$ rate representative of the field sync pulse component of the recorded signal.

The output of pulse forming circuit 200 forms the control pulse input for terminal S2 (FIGS. 1, 2), and is also supplied to an input terminal of integrated circuit 211, to develop a horizontal rate output with phasing determined by RC circuit elements 215 and 216 coupled to appropriate terminals of integrated circuit 211. This horizontal rate output is supplied as one of the inputs to triple input nand gates 221, 222, 225 and 226; these gates also receive an $f_H/2$ rate input, with gates 221 and 225 of this group receiving the pulse train developed at terminal HH, and with gates 222 and 226 receiving a phase inverted version of such pulse train developed by inverter 220.

The third input for gates 221 and 226 of the above-discussed triple input gate group is derived from an output of a D type flip-flop section of integrated circuit 260; the third input for the remaining gates (222, 225) of said group is derived from another output of said D type flip-flop section, which is oppositely phased relative to the first output. The respective inputs of this D type flip-flop section are: (a) a horizontal rate output of integrated circuit 211 of inverted phase relative to the previously mentioned output thereof; and (b) a vertical rate output of integrated circuit 230. To develop this output, one section of integrated circuit 230 receives an input from terminal V and develops a first $f_V$ rate output (at chip terminal 13) with phasing influenced by RC elements 231, 232. This first $f_V$ rate output is supplied as the vertical blanking component input to adder 271, 272 which supplies blanking signals to terminal B; the first $f_V$ rate output is also supplied as input to another section of integrated circuit 230 (via chip terminal 9), the develop a second $f_V$ rate output (at chip terminal 5) with phasing influenced by RC elements 233, 234, which output comprises the $f_V$ rate input to the aforementioned D type flip-flop section. A phase inverted version of the first $f_V$ rate output (at chip terminal 4) is the control signal supplied to terminal S1.

Nand gates 223 and 224 are connected as two-input nand gates. An $f_H/2$ input of nand gate 223 is derived from terminal HH, while an inverted $f_H/2$ input of nand gate 224 is derived from inverter 220. The other input for both of gates 223 and 224 is derived from a first horizontal rate output of integrated circuit 240 (at chip terminal 12). To develop this output, a section of integrated circuit 240 receives (at chip terminal 9) an input from terminal H, and develops the first horizontal rate output with phasing influenced by RC elements 241, 242. This first horizontal rate output is also supplied as the control signal for terminal G7.

Integrated circuit 240 also includes a second section, developed a second horizontal rate output (at chip terminal 4), with phasing influenced by RC elements 243, 244, in response to signals from terminal H (applied to chip terminal 1). This second horizontal rate output is applied via a resistor to the base of PNP transistor 252. The emitter of transistor 252 is returned to a +5V. supply point. An RC network, comprising capacitor 254 in shunt with resistor 253, shunts the base-emitter path of transistor 252. An intermediate point on a voltage divider, formed by resistors 255, 256 connected between ground and a −15V. supply point, is connected to the collector of transistor 252. The voltage at the collector of transistor 252 is coupled via diode to terminal G8.

A coupling network 210 couples reference oscillations from oscillator 140 (FIG. 2) to an input of a section of integrated circuit 211. A reference oscillation output of adjustable phasing is derived from an output (chip terminal 13) of integrated circuit 211, with phasing influenced by RC elements comprising capacitor 214 and resistors 213 and 212 (the latter being variable), and supplied to terminal RO.

Reference oscillations from terminal RO, in addition to application to phase detector 81 (FIG. 1), are applied as one input to a second D type flip-flop section of integrated circuit 260. The other input for this second D type flip-flop section is horizontal rate signals from terminal H (applied to chip terminal 12). An output of the second D type flip-flop section (at chip terminal 9) is coupled by capacitor 261 to terminal P1. The collector of an NPN transistor 264 is also connected to terminal P1, and via resistor 263 to a +5v. supply point (and via resistor 262 to a point of ground potential). A resistor 265 shunts the base-emitter path of transistor 264. A capacitor 266 couples the first horizontal rate output of integrated circuit 240 to the base of transistor 264. An inverted version of said first horizontal rate output of integrated circuit 240 (at chip terminal 5) is supplied to adder 271, 272 as the horizontal blanking component.

Figure 4:
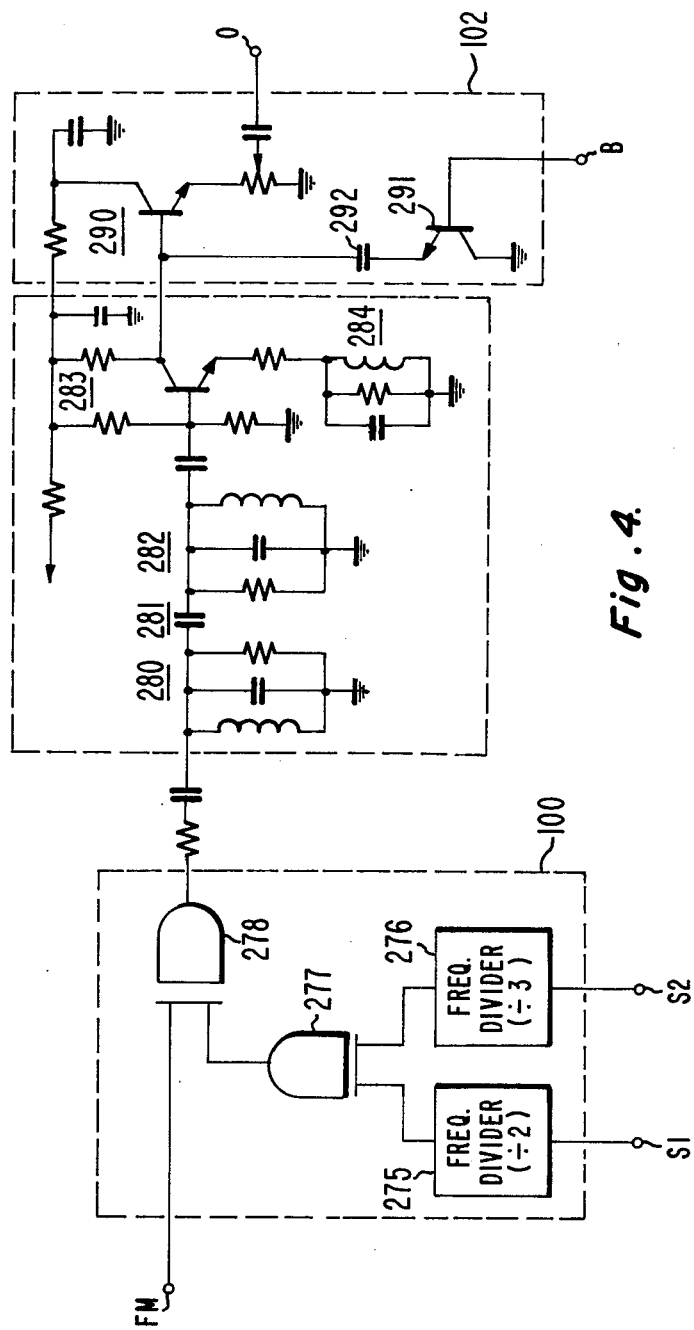
FIG. 4 illustrates, partially schematically and partially by block diagram representation, circuitry that may be employed in an implementation of the SECAM modulator apparatus of FIG. 1.

FIG. 4 is illustrative of circuit arrangements which may be employed in performing the functions of elements 100, 101 and 102 of the apparatus of FIG. 1. The switched phase reverser 100 includes a frequency divider 275 dividing by two the frequency of the $f_V$ rate signal delivered to terminal S1, and a frequency divider 276 dividing by three the frequency of the $f_H$ rate signal delivered to terminal S2. The frequency divider outputs are supplied to exclusive-or gate 277. The outputs of gate 277, and the VCO output from terminal FM, form the inputs for exclusive-or gate 278, which develops the output of switched phase reverser 100.

Bandpass filter 101 includes a pair of parallel tuned circuits 280, 282 capacitively coupled by capacitor 281. The illustrated bandpass filter circuitry also includes a transistor amplifier 283 subject to frequency selective degeneration of the input signal due to the presence of a parallel tuned circuit 284 in the amplifier transistor's emitter circuit, the degeneration introducing the desired encoding filter characteristic, with the resonant frequency of tuned circuit 284 at the desired frequency of 4.286 MHz.

Blanking gate 102 includes an emitter-follower stage 290, normally supplying the output of BPF 101 to output terminal 0. However, periodically, a low impedance path formed by capacitor 292 and the conducting emitter-collector path of NPN transistor 291, shunts the input of the emitter-follower to blank the output. Control of conduction of transistor 291 is effected by the blanking signals appearing at terminal B, which is connected to the base of transistor 291.

FIG. 8 illustrates another use for the modulator of FIG. 1 (and for the control pulse forming circuits of FIG. 3), i.e., use in a PAL-SECAM transcoder. In FIG. 8, a PAL composite color video signal source 310 supplies a PAL signal to a high pass filter 321, and to a low pass filter 311. An output of lowpass filter 311 is supplied to a sync separator 317, which develops separated synchronizing components at terminal SS for application to control pulse forming circuits 134 (illustratively, of the type shown in FIG. 3).

An output of the high pass filter 321 (inclusive of the PAL chrominance component) is applied to color demodulators 323, which, in response to said chrominance component and to appropriately phased reference oscillations at the PAL subcarrier frequency, develops red and blue color-difference signals for application to the color-difference signal input terminals (R-Y, B-Y) of a SECAM modulator 135 of the FIG. 1 type. The reference oscillations are developed by a reference crystal oscillator 325, operating at the PAL subcarrier frequency (4.43361875 MHz.) (and desirably synchronized in phase with the average burst phase of the PAL signal, as suggested by the dotted-line labeled "s"). Suitable deswitching at an $f_H/2$ rate, in response to signals from terminal HH of circuits 134, is effected in the R-Y demodulation operation within demodulator apparatus 323, so that the same polarity of the red color-difference signal is supplied to terminal R-Y in successive line intervals. An output of oscillator 325, applied via phase shifter 329, supplies the reference oscillation input required for application to reference input terminal RO of modulator 135. Luminance signal processing circuits 312 provide processing of an output of low pass filter 311 to develop a luminance signal with proper timing and magnitude, for combination in adder 313 with a SECAM chrominance component from the output terminal 0 of modulator 135, to develop a composite color video signal of SECAM form at output terminal CV.

Operation of modulator 135 is as previously described for video disc player use, with the exception that $f_X$ is here equal to the PAL subcarrier frequency (which also lies within the desired SECAM deviation range).

While the modulator uses heretofore described have advantageously employed a single-reference synchronizing system, it will be appreciated that features of the invention (e.g., relating to asymmetrical limiting and line identification signal generation) may also be employed (e.g., in SECAM cameras) in conjunction with other synchronizing systems (e.g., dual reference types).

What is claimed is:

1. Apparatus for forming a color television signal of the SECAM type from correlated signals inclusive of a first color-difference signal and a second color-difference signal, said apparatus including:
 a controlled oscillator providing an output comprising oscillations of a frequency subject to variation in accordance with a voltage applied to a modulating signal input terminal thereof;
 first and second transistors, each having respective base, emitter and collector electrodes;
 a substantially constant current source coupled in common to the emitter electrodes of both of said first and second transistors;
 a load impedance coupled to the collector electrode of said second transistor;

first switch means for selectively enabling and disabling the application of said first color-difference signal to said base electrode of said first transistor;

second switch means for selectively enabling and disabling the application of said second color-difference signal to said base electrode of said second transistor;

third switch means for controlling the magnitude of a bias potential applied to said base electrode of said first transistor;

fourth switch means for controlling the magnitude of a bias potential applied to said base electrode of said second transistor;

first switch control means coupled to said first and second switch means for causing the enablement of said first color-difference signal application only during alternate ones of a succession of line scanning intervals, and the enablement of said second-color-difference signal application only during line scanning intervals intervening between said alternate ones;

second switch control means coupled to said third and fourth switch means for causing the bias potential magnitude applied to the base electrode of one of said first and second transistors to exceed the bias potential magnitude applied to the base electrode of the other of said first and second transistors during said alternate ones of said succession of line scanning intervals, and for causing the bias potential magnitude applied to the base electrode of said other transistor to exceed the bias potential magnitude applied to said one transistor during said intervening ones of said succession of line scanning intervals; and means for causing the voltage applied to the modulating signal input terminal of said controlled oscillator to follow variations in the voltage drop across said load impedance.

2. Apparatus in accordance with claim 1 wherein said correlated signals have recurring vertical blanking intervals; and wherein said second switch control means additionally serves to cause, (a) during alternate ones of a succession of line interval segments occurring near the end of each such vertical blanking interval, the bias potential applied to the base electrode of said one transistor to remain fixed at a given magnitude while the bias potential applied to the base electrode to said other transistor remains fixed at a magnitude exceeding said given magnitude during an initial portion of such line interval segment and rises gradually toward a still higher magnitude during a succeeding portion of such line interval segment, and, (b) during line interval segments intervening said alternate ones of said succession of line interval segments, the bias potential applied to the base electrode of said other transistor to remain fixed at said given magnitude while the bias potential applied to the base electrode of said one transistor remains fixed at a magnitude exceeding said given magnitude during an initial portion of such line interval segment and rises gradually toward a still higher magnitude during a succeeding portion of such line interval segment.

3. Apparatus in accordance with claim 1 wherein said correlated signals have periodic line blanking intervals intervening between successive ones of said succession of line scanning intervals, with a portion of each line blanking interval preceding the concluding portion thereof comprising a line synchronizing interval; wherein said second switch control means additionally serves to maintain the bias potential applied to the base electrodes of both of said transistors at said given magnitude during said periodic line synchronizing intervals; said apparatus also including:

a source of reference oscillations;

a phase detector, responsive to an output of said controlled oscillator and to an output of said reference oscillation source, for developing a control voltage indicative of the magnitude and sense of departures, if any, from a given phase relationship between said respective outputs;

a capacitor;

selectively enabled means for altering the charge on said capacitor in response to variations, if any, of said control voltage; and means for enabling said charge altering means during a given portion of each of said periodic line synchronizing intervals, said voltage at said modulating signal input terminal being responsive to alterations, if any, in the charge on said capacitor.

4. Apparatus in accordance with claim 3 wherein said means for causing the voltage applied to said modulating signal input terminal to follow variations in the voltage drop across said load impedance includes:

a voltage follower stage having an input terminal and an output terminal, said voltage follower stage exhibiting a high input impedance at the input terminal thereof;

means providing a direct current conductive coupling between said output terminal of said voltage follower stage and said modulating signal input terminal of said controlled oscillator; and means for coupling said capacitor between the collector electrode of said second transistor and said input terminal of said voltage follower stage.

5. Apparatus in accordance with claim 4 also including:

fifth switch means coupled to said load impedance for causing the flow of a current component of a given magnitude through said load impedance when in a first switching state, and for precluding the flow of said current component therethrough when in a second switching state; and third switch control means coupled to said fifth switch means for maintaining said first switch means in said second switching state only during said given line synchronizing interval portion, which portion precedes a terminal portion of said line synchronizing interval.

6. Apparatus in accordance with claim 5 wherein the reference oscillations provided by said source are of the same reference frequency during horizontal synchronizing intervals preceding said alternate ones of said succession of line scanning intervals and during horizontal synchronizing intervals preceding said intervening ones of said succession of line scanning intervals.

7. Apparatus in accordance with claim 6 wherein the response of said controlled oscillator to said alterations of charge on said capacitor serves to effect a synchronization of the output frequency of said oscillator with said reference frequency prior to the termination of said given portion of each of said line synchronizing intervals, and wherein the switching of said fifth switch means from said second state to said first state by said third switch control means causes said oscillator input frequency to change to a second frequency different from said reference frequency during said terminal portion of each of said line synchronizing intervals preceding both said alternate ones of said intervening ones of said succession of line scanning intervals.

8. Apparatus in accordance with claim 7 wherein control of said third and fourth switch means by said second switch control means effects application of one set of magnitudes of bias potentials to the respective base electrodes of said transistors during said concluding portion of the line blanking intervals preceding said alternate ones of said succession of line scanning intervals, and application of another set of magnitudes of bias potential to the respective base electrodes of said transistors during said concluding portion of the line blanking intervals preceding said intervening ones of said succession of line scanning; wherein said one set of magnitudes is such that the output frequency of said oscillator is shifted from said second frequency to a third frequency, higher than said second frequency and different from said reference frequency, during said concluding portions of said line blanking intervals preceding said alternate ones of said succession of line scanning intervals; and wherein said other set of magnitudes is such that the output frequency of said oscillator is shifted from said second frequency to a fourth frequency, lower than said second frequency and different from said reference frequency, during said concluding portions of said line blanking intervals preceding said intervening ones of said succession of line scanning intervals.

9. Apparatus in accordance with claim 8 wherein control of said third and fourth switch means by said second switch control means maintains application of said one set of magnitudes of bias potential to the respective base electrodes of said transistors during said alternate ones of said succession of line scanning intervals, and application of said other set of magnitudes during said intervening ones of said succession of line scanning intervals.

10. Apparatus in accordance with claim 9, for use with a source of color television signals of the PAL type, inclusive of a chrominance signal comprising a modulated subcarrier component; said apparatus also including:
demodulator means, responsive to said modulated subcarrier component and to reference oscillations from said oscillation source, for developing said first and second color-difference signals.

11. Apparatus in accordance with claim 10, wherein said reference frequency substantially corresponds to 4.43361875 MHz.; wherein said third frequency substantially coresponds to 282 $f_H$, where $f_H$ equals the line repetition rate of said color television signals; wherein said fourth frequency substantially corresponds to 272 $f_H$; and wherein said second frequency falls substantially midway between said third and fourth frequencies.

12. Apparatus in accordance with claim 9, for use in a video disc player including means for transcoding color television signals recovered from a video disc record to color television signals of an NTSC-like form, inclusive of a chrominance signal comprising a modulated subcarrier component, wherein said subcarrier frequency substantially corresponds to said reference frequency; said apparatus also including:
demodulator means, responsive to said modulated subcarrier component and to reference oscillations from said oscillation source, for developing said first and second color-difference signals.

13. Apparatus in accordance with claim 12, wherein said reference frequency substantially corresponds to $f_H$ multiplied by 283½, where $f_H$ equals the line repetition rate of said color television signals; wherein said third frequency substantially corresponds to 282 $f_H$; wherein said fourth frequency substantially corresponds to 272 $f_H$; and wherein said second frequency falls substantially midway between said third and fourth frequencies.

14. Apparatus in accordance with claim 13 wherein said color television signals have recurring field blanking intervals; and wherein said second switch control means additionally serves to cause, (a) during alternate ones of a succession of line intervals segments occurring near the end of each such field blanking interval, the bias potential applied to the base electrodes of said one transistor to remain fixed at a given magnitude while the bias potential applied to the base electrode of said other transistor remains fixed at a magnitude exceeding said given magnitude during an initial portion of such line interval segment and rises gradually toward a still higher magnitude during a succeeding portion of such line interval segment, and to cause, (b) during line interval segments intervening said alternate ones of said succession of line interval segments, the bias potential applied to the base electrode of said other transistor to remain fixed at said given magnitude while the bias potential applied to the base electrode of said one transistor remains fixed at a magnitude exceeding said given magnitude during an initial portion of such line interval segment and rises gradually toward a still higher magnitude during a succeeding portion of such line interval segment.

15. Apparatus in accordance with claim 14, wherein said one transistor is said first transistor; wherein said first-named potential rise is such as to effect cut-off of said first transistor prior to the conclusion of said succeeding portion of each of said alternate ones of said line interval segments; and wherein said second-named potential rise is such as to effect cut-off of said second transistor prior to the conclusion of said succeeding portion of each of said intervening ones of said line interval segments.

16. Apparatus in accordance with claim 15, wherein the voltage drop across said load impedance during said cut-off of said first transistor is such as to cause the output frequency of said controlled oscillator to substantially equal 3.9 MHz.; and wherein the voltage drop across said load impedance during said cut-off of said second transistor is such as to cause the output frequency of said controlled oscillator to substantially equal 4.75625 MHz.

17. Apparatus in accordance with claim 3, for use with a source of color television signals of an NTSC type, inclusive of a chrominance signal comprising a modulated subcarrier component, wherein said subcarrier frequency substantially corresponds to said reference frequency; said apparatus also including:
demodulator means, responsive to said modulated subcarrier component and to reference oscillations from said oscillation source, for developing said first and second color-difference signals.

18. Apparatus in accordance with claim 3, for use with a source of color television signals of the PAL type, inclusive of a chrominance signal comprising a modulated subcarrier component, wherein said subcarrier frequency substantially corresponds to said reference frequency; said apparatus also including:

demodulator means, responsive to said modulated subcarrier component and to reference oscillations from said oscillation source, for developing said first and second color-difference signals.

19. Apparatus in accordance with claim 3, for use in a video disc player including means for transcoding color television signals recovered from a video disc record to color television signals of an NTSC-like form, inclusive of a chrominance signal comprising a modulated subcarrier component, wherein said subcarrier frequency substantially corresponds to said reference frequency; said apparatus also including:

demodulator means, responsive to said modulated subcarrier component and to reference oscillations from said source, for developing said first and second color difference signals.

20. Apparatus in accordance with claim 3, wherein said correlated signals also include a deflection synchronizing component inclusive of periodic line sync pulses occurring during said line synchronizing intervals; said apparatus also including:

means, coupled to said controlled oscillator and responsive to the leading edge of each of said periodic line sync pulses, for setting the phase of the output of said oscillator at the beginning of each line synchronizing interval.

21. Apparatus in accordance with claim 20 also including:

means, coupled to said controlled oscillator and responsive to the trailing edge of each of said periodic line sync pulses, for resetting the phase of the output of said oscillator at the beginning of each concluding portion of said periodic line blanking intervals.

* * * * *